United States Patent
Hauth et al.

(10) Patent No.: US 10,719,889 B2
(45) Date of Patent: Jul. 21, 2020

(54) SECONDARY PROFILES WITH CONFIDENCE SCORES

(71) Applicant: Microsoft Technology Licensing, LLC, Redmond, WA (US)

(72) Inventors: Tobias M. Hauth, Palo Alto, CA (US); Paul M. Tyma, San Francisco, CA (US); Guanchao Wang, Santa Clara, CA (US); David Siuwai Lau, Mountain View, CA (US); Sowmitra Thallapragada, Fremont, CA (US); Richard G. Ramirez, Los Altos, CA (US); Pratik Daga, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 913 days.

(21) Appl. No.: 15/135,412

(22) Filed: Apr. 21, 2016

(65) Prior Publication Data

US 2017/0308807 A1      Oct. 26, 2017

(51) Int. Cl.
*G06F 16/9535* (2019.01)
*G06F 16/2457* (2019.01)
(Continued)

(52) U.S. Cl.
CPC ....... *G06Q 50/01* (2013.01); *G06F 16/24578* (2019.01); *G06F 16/9535* (2019.01); *G06N 5/022* (2013.01)

(58) Field of Classification Search
CPC .................. G06F 16/24578; G06F 16/9535
(Continued)

(56) References Cited

U.S. PATENT DOCUMENTS

| 8,543,422 | B2 | 9/2013 | Maman et al. |
| 8,849,813 | B1 * | 9/2014 | Iyer .................. H04L 67/306 |
| | | | 707/728 |

(Continued)

OTHER PUBLICATIONS

"Non Final Office Action Issued in U.S. Appl. No. 15/135,416", dated Apr. 19, 2018, 25 Pages.

(Continued)

*Primary Examiner* — Kimberly L Wilson
(74) *Attorney, Agent, or Firm* — Schwegman Lundberg & Woessner, P.A.

(57) ABSTRACT

A system, apparatus, and method are provided for implementing secondary profiles for members of an online application or service. Each member has a corresponding primary profile populated by the member, and a secondary profile populated with information from data sources other than the member. Each fact or entry in the secondary (or inferred) profile is accompanied by a confidence score reflecting confidence in the source of the fact, confidence that the fact is correctly associated with this member, and/or other factors. A given fact may be obtained or extracted from multiple sources, with each copy or version assigned a separate confidence score. In response to a request to identify members having a particular attribute, in addition to identifying members that have the attribute in their primary profiles, members having the attribute in their secondary profiles may be identified if the corresponding confidence scores are greater than a threshold.

17 Claims, 4 Drawing Sheets

(51) Int. Cl.
*G06Q 50/00* (2012.01)
*G06N 5/02* (2006.01)

(58) Field of Classification Search
USPC .......................................................... 707/728
See application file for complete search history.

(56) References Cited

U.S. PATENT DOCUMENTS

| | | | |
|---|---|---|---|
| 8,996,530 B2* | 3/2015 | LuVogt | G06Q 10/10 707/740 |
| 2012/0110071 A1 | 5/2012 | Zhou et al. | |
| 2013/0151527 A1 | 6/2013 | Bruich et al. | |
| 2015/0161190 A1 | 6/2015 | Ariel et al. | |
| 2015/0324454 A1* | 11/2015 | Roberts | G06F 16/338 707/734 |
| 2015/0363481 A1* | 12/2015 | Haynes | G06Q 10/10 707/748 |
| 2016/0364427 A1 | 12/2016 | Wedgeworth, III | |
| 2017/0308534 A1 | 10/2017 | Ramirez et al. | |

OTHER PUBLICATIONS

"Final Office Action Issued in U.S. Appl. No. 15/135,416", dated Jan. 10, 2019, 22 Pages.

* cited by examiner

SECONDARY PROFILES WITH CONFIDENCE SCORES

RELATED ART

The subject matter of this application is related to the subject matter in co-pending U.S. patent application Ser. No. 15/135,416, entitled "Secondary Profiles with Credibility Scores", which was filed even date herewith and issued on 21 May 2019 as U.S. Pat. No. 10,296,511, and is incorporated herein by reference.

BACKGROUND

This disclosure relates to the field of computer systems. More particularly, a system, apparatus, and methods are provided for assembling a secondary member/user profile that is separate from a primary profile that is principally populated by the member or user.

In some user environments, such as a social network, users populate personalized user profiles as they see fit. These profiles, or at least parts of these profiles, may be visible to other users, such as user with whom they have formed connections. However, not all users fully populate their profiles, while some users do not update their profiles as their circumstances change (e.g., when they change employers, when they transition to a new position), and others do not populate their profiles with accurate information or do not correct their profiles as information becomes outdated.

If a user's profile is relied upon to identify content that may be of interest to him or her (e.g., postings by other users, news articles), the less accurate the profile is, the less likely the selected content will interest that user. Even if a system that hosts or supports the environment perceives that a given field or entry in a user's profile is incorrect, it is unlikely (or unable) to make the correction because the profile is intended to be configured by the user.

In addition, when the host of the social network desires to make some content or offer available to users that may be interested, if only the users' primary profiles are considered when determining which users may be interested, a significant portion of the user community may be excluded from receipt, even though they would be interested.

DETAILED DESCRIPTION

Figure 1:
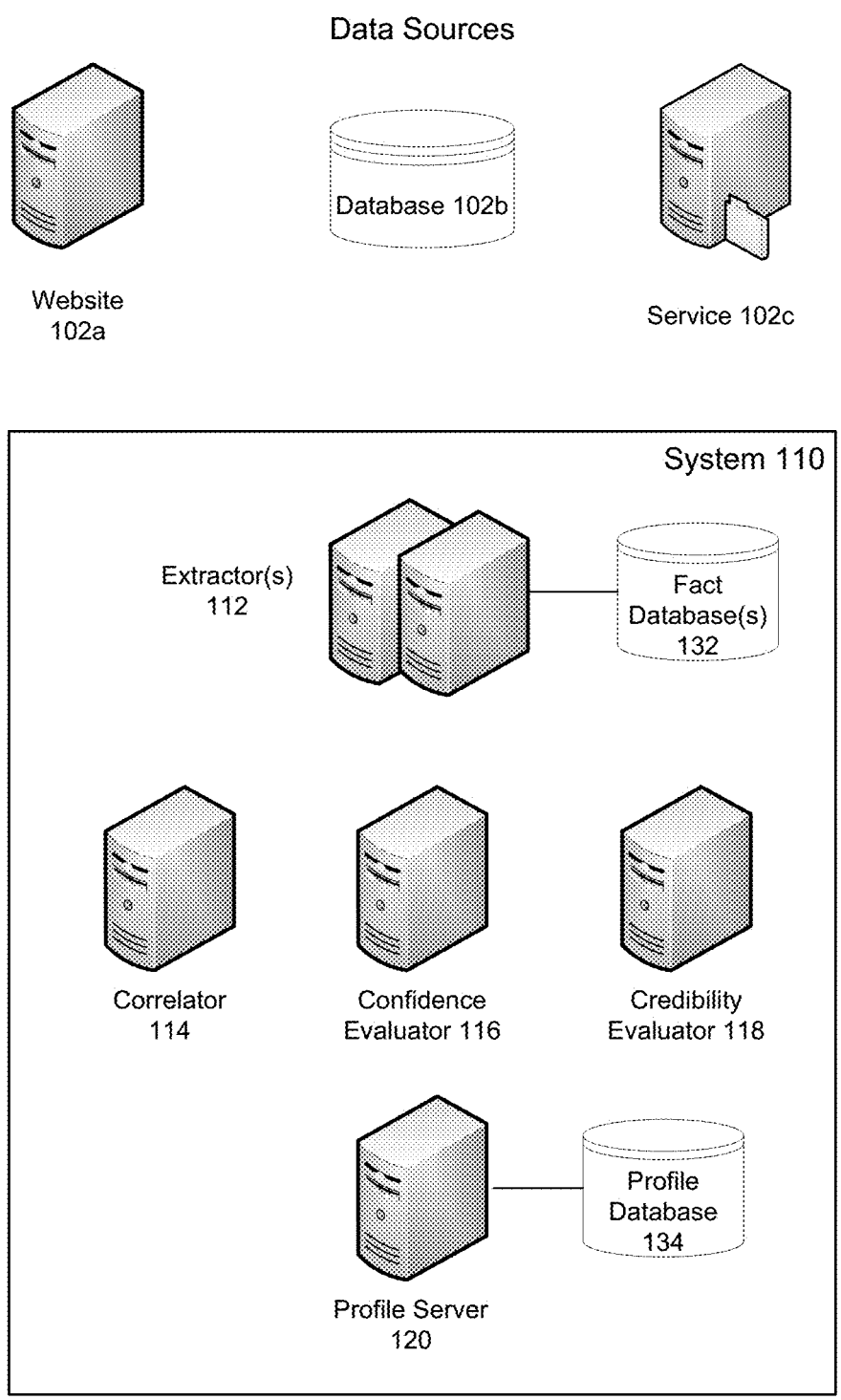
FIG. 1 is a block diagram depicting a system in which secondary (or inferred) profiles may be employed, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, apparatus, and methods are provided for assembling a secondary member profile that is separate from a primary member profile. The profiles represent the members (or users) of some type of user community, such as a community of users of a professional network or a social network.

In these embodiments, a member generally populates his or her primary profile, which may alternatively be termed an official or public profile. Some or all attributes or fields of the primary profile may be shared with other members (or users), such as those with whom the member has relationships (e.g., as friends, associates, followers, subscribers), and may be publicly viewable by other users with whom the member does not have a relationship.

In contrast, the member's secondary profile (alternatively termed an inferred or private profile) is populated by one or more entities other than the member, using data (e.g., posts, connections' profiles, articles, publications, other documents) generated within the user community and/or obtained from external sources. For example, the organization that hosts or provides the user community may populate the member's inferred profile. Generally, the secondary profile is not viewable by other members and users, and may or may not be viewable by the member. In some implementations, however, the member may be asked to confirm (or deny) information considered for addition to his or her secondary profile.

Another difference between primary and secondary profiles in these embodiments is that components of a secondary profile (e.g., fields, attributes, characteristics) have corresponding scores reflecting the confidence or probability that the components' values are correct or are correctly associated with the corresponding member. Whereas components of a primary profile may be assumed to be correct because they are volunteered by the owner of the profile (i.e., the member or user corresponding to the profile), components of the secondary profile are derived from other sources and therefore may or may not be accurate.

As a specific example, consider a value inferred for an educational institution attended by a member (e.g., a school, a university), possibly because the member did not populate this field of his or her primary profile. One or more data sources may indicate that the member attended a particular university but, among other complications, a given data source may be in error, or a reference to the member (e.g., by name) may actually be a reference to someone else having the same name. Therefore, the confidence score assigned to a component of the member's secondary profile that indicates that he or she attended a given university may account for the certainty or uncertainty regarding that fact.

Thus, if the member does not populate a particular field of his or her primary profile, such as a school or university attended, a level of education, a job title, a certification, a publication, or some other component, or even if he or she does populate the field in some embodiments, the secondary profile may include an inferred value for the field (e.g., a specific school or university, level of education, job title, certification, journal article) that was gleaned or obtained from some source or sources other than the member. Illustrative sources for these examples include lists of graduates of different schools/universities, a reference to the member in a post or other communication, a message generated by the member, a description of the member in some other user community, a publication authored by the member, attributes of primary (and/or secondary) profiles of other users with whom the member has a relationship, and so on.

Because the inferred value may not be correct, it is assigned a score reflecting a confidence in the value or the likelihood that the value is correct. This confidence score may depend on the source of the information, the probability that the information used to infer the component value actually pertains to this member (e.g., and not someone else having the same name), and/or other factors.

Thus, in some embodiments, a system, apparatus, and methods are provided for determining confidence scores for data added to (or considered for addition to) a member's secondary profile. If one possible value (e.g., one "fact") for a given attribute is obtained from multiple different sources, their individual confidence scores may be aggregated in some manner to produce a final confidence score for the value assigned to the profile attribute.

Alternatively, some or all of multiple different values obtained from multiple sources may be incorporated into the secondary profile, each having its own confidence score, possibly even if the attribute can only have a single value in a primary profile. For example, if multiple different data sources indicate different values for one particular attribute (e.g., current job title, current employer, undergraduate degree), the member's secondary profile may include all of them, each one having a corresponding confidence score.

In some further embodiments, a system, apparatus, and methods are provided for determining credibility scores or calibration scores for sources of data added to (or considered for addition to) a secondary profile. In these embodiments, a data source's credibility (or calibration) score is designed to reflect an observed or estimated measure of the source's reliability. A given source's credibility score may therefore be proportional to how often it is 'correct' (if correctness of a component of a secondary profile can be determined— perhaps by confirmation by the member) or how often its data agrees with data provided by other sources.

In these embodiments, when a possible value for a particular attribute of a secondary profile is obtained from a source, its credibility score will affect the confidence score associated with the value. For example, the process of matching the data to a member may yield an initial confidence score, then the source's credibility score may be applied to yield a final confidence score for use with the member's secondary profile.

A credibility score or a confidence score may be a percentage, a number between 0 and 1, an integer or whole number between 0 and 100, or may have some other form. In some embodiments, a data source's credibility score cannot have a value indicating that a source is always correct (e.g., 100%, 1, 100) or always incorrect (e.g., 0%, 0); similarly, in these embodiments an inferred value for a component of a secondary profile may never have a confidence score indicating that the value is certain to be true (e.g., 100%) or certain to be false (e.g., 0%); in other embodiments, however, any of these may be possible.

In some alternative embodiments, for example, a confidence score may even be negative. By way of illustration, this may occur if the corresponding member expressly refutes or denies an inferred value. For example, if the member is prompted to add to his or her primary profile a particular value for a particular profile attribute or component inferred from one or more data sources, and the member specifically refutes the value, it may be retained in the member's secondary profile with a confidence score that is negative (or zero).

Individual items or pieces of information obtained from data sources may be referred to herein using terms such as "facts," "alleged facts," "inferred facts," and/or others. Thus, a "fact" asserted by or obtained from a data source may be adopted as an inferred value within a secondary profile, with a corresponding confidence score. Illustratively, each piece of information extracted from a given source may be considered a separate fact, or multiple pieces of information may be combined into a single fact. A "source" or a "data source" referred to herein may be a repository of data (e.g., a database, a publication repository, a collection of documents) or something (e.g., a technical paper, an article, a patent, a member profile, or some other document or record) extracted from a data repository, which can be parsed or analyzed to identify individual facts.

In an illustrative implementation, secondary or inferred profiles may be used to increase a pool of members or users that are deemed to satisfy (or that potentially satisfy) some criteria. For example, if the organization that hosts or manages the user community desires to offer something (e.g., a content item such as a job posting or an article, a suggested edit to their primary profiles) to members having a particular certification (e.g., CPA or Certified Public Accountant, CFP or Certified Financial Planner, CISSP or Certified Information Systems Security Professional), it may wish to make the offer not only to members who explicitly identified themselves (i.e., in their primary profiles) as possessing the certification, but also members that may have the certification. Thus, the organization may extend the offer to members whose secondary profiles indicate, with at least a threshold confidence score or level (e.g., 50%, 70%), that they hold the certification.

In other implementations, other information may be added to a member's secondary profile with corresponding confidence, such as an indication that the member authored (or co-authored) a publication (e.g., with 61% confidence), was issued a U.S. (and/or foreign) patent (e.g., 99.9%), resides or works in a particular geographical location (e.g., 87%), possesses 'project management' as a skill (e.g., 48%), etc.

Information added (or considered for addition) to a secondary profile may be categorized, and a member may be able to allow or deny use or analysis of data and/or data sources associated with the categories. Illustrative categories include accomplishments (e.g., awards, publications, patents), education (e.g., schools attended, training completed), experience (e.g., positions, job titles, employers, industry, projects), recommendations (e.g., endorsements from other users, ratings), skills (e.g., skills associated with a current or previous job, professional certifications), location, and so on. As will be discussed below, virtually any source of information related to any of these categories (and/or others) may be harvested for facts associated with or corresponding to members of a user community, subject to the member's permission as applicable.

In addition, however, some data that may be sensitive to a member may not be collected or processed, or considered for addition to a secondary profile unless a member explicitly authorizes it, such as marital status, age or date of birth, military service, contact information (e.g., telephone number, residential address), citizenship, graduation dates, and so on. Other data considered less sensitive, may be collected, processed, or possibly added to a secondary profile, such as connections within (and/or without) the user community, publications authored, patents issued, language skills, and so on, unless the member prohibits such use.

FIG. 1 is a block diagram depicting a system in which secondary (or inferred) profiles may be created and/or employed, according to some embodiments. In these embodiments, secondary profiles maintained within system 110 are populated with information obtained from one or more external data sources, such as website 102a, database 102b, application or service 102c, and so on, and/or one or more internal data repositories, such as profile database 134 and/or other repositories, whether mentioned herein or not.

System 110 of FIG. 1 is (or is part of) a data center or other cooperative collection of computing resources, and includes different components in different embodiments. In the illustrated embodiments, the system includes extractor(s) 112, correlator 114, confidence evaluator 116, credibility evaluator 118, profile server 120, fact database(s) 132, and profile database 134, and may illustratively be used to host or support a user community such as a social network or a professional network.

Extractor(s) 112 extract structured data (e.g., records, publications, lists, other documents) and/or unstructured data (e.g., text) from data sources. Separate extractors may be configured to extract data from different data sources, or a given extractor may be configured to extract information from multiple sources. For example, one set of extractors 112 may comprise software modules for extracting patent publications from one or more sources (e.g., www.google.com/patents, www.uspto.gov), another set of extractors may be configured to extract medical publications (e.g., from www.ncbi.nlm.nih.gov/pubmed, www.sciencedirect.com), another set may extract financial information (e.g., from www.sec.gov/edgar.shtml), another set may extract scientific publications (e.g., www.ams.org/about-us/rss, www.plosone.org/taxonomy, dblp.uni-trier.de) and so on.

Each extractor or set of extractors may therefore be associated with one type/category of data or one or more attributes of a secondary profile. Extracted documents, facts, and/or other information obtained by extractor(s) 112 may be stored in one or more databases or repositories, such as fact database(s) 132 or a repository external to system 110.

Correlator 114 correlates facts obtained by extractors 112 with specific members of the community or service hosted by system 110. For example, the correlator may recognize names (e.g., first name and last name) and/or other indicia (e.g., electronic mail addresses, telephone numbers, usernames, domain name, name of employer or affiliated organization, photograph or image) within information obtained by the extractor(s), or may receive such indicia from some other entity, and identify one or more members (or users) that (may) correspond to the indicia. Thus, individual facts may be correlated or associated with one or more members based on data within the facts and/or data related to the facts (e.g., information from the data repository).

Correlation of a fact with a member may also, or instead, involve examining members' connections. For example, if a document received from a data source appears to identify one or more members, facts derived from that document may be matched with those members whose connections include one or more other individuals identified (or apparently identified) in the document. Similarly, a document may identify a specific entity of some type (e.g., an educational institution, a company), and a member may be matched to that entity (and/or other facts in the document) if he or she has a significant number or percentage of connections whose profiles name the entity in a corresponding attribute (e.g., school/university), especially if the member has not populated that component of his/her primary profile. Further, writing styles may be used to match a publication (e.g., an anonymous publication, a publication that does not (adequately) identify its author(s)) to a member, by comparing the writing style of the publication with written products of the member.

In some other implementations, correlation of a name or other indicia with a member may be based on a method described in U.S. patent application Ser. No. 14/565,158, filed Dec. 9, 2014 and entitled "Disambiguating Personal Names," or U.S. patent application Ser. No. 14/565,165, filed Dec. 9, 2014 and entitled "Disambiguating Organization Names," both of which are incorporated herein by reference.

Confidence evaluator 116 calculates or estimates a confidence score to associate with each fact added to a member's secondary profile, to reflect the certainty or likelihood that the fact is correct for the member. Similarly, credibility evaluator 118 calculates or estimates a credibility score for each fact source, to reflect the source's accuracy or reliability (e.g., as observed over some period of time). In some embodiments, evaluators 116, 118 (or functionality of the evaluators) may be merged. Generation of confidence scores and credibility scores is discussed in more detail below.

A given fact may be correlated or associated with multiple members (e.g., members having the same full or partial names), and multiple versions or copies of a given fact may be obtained from different sources (by extractors 112), each of which is assigned a separate confidence score for each member with whom the fact is correlated. As previously indicated, a given fact's confidence score may be adjusted by the credibility score of its source. In embodiments in which multiple facts are combined to yield one value for a particular attribute of a particular member's secondary profile (e.g., as opposed to embodiments in which all of them are included in the secondary profile with their separate confidence scores), a final confidence score will be generated from the facts' individual initial confidence scores and/or other data (e.g., credibility scores of the facts' sources).

Profile server 120 and profile database 134 maintain secondary/inferred profiles of members/users of the user community, application, or service that is hosted, supported by, or associated with system 110. Members' primary profiles may also be maintained by the profile server and the profile database, or may be maintained by some other entities not depicted in FIG. 1 (e.g., another profile server and associated profile database). The profile server, and/or some other component of system 110, may receive and respond to queries regarding member's primary and/or secondary profiles.

An individual member's primary and/or secondary profile may include or reflect any number of attributes or characteristics of the member, including personal (e.g., gender, age or age range, interests, hobbies, member ID), professional (e.g., employment status, job title, job location, employer or associated organization, industry, functional area or role, skills, endorsements, professional awards, seniority), social (e.g., organizations the user is a member of, geographic area of residence, friends), educational (e.g., degree(s), university attended, other training), etc. A member's primary and/or secondary profile, or attributes or dimensions of either or both profiles, may be used in various ways by system components (e.g., to identify or characterize the member, to characterize a member connection that involves the member, to characterize content with which the member interacts, to identify content topics/items that may interest the member, to select content to serve to the member, to record a content event).

Organizations may also be members of the service(s) offered or supported by system 110 (i.e., in addition to individuals), and may have associated primary and/or secondary profiles comprising attributes such as industry, size, location, goal or purpose, etc. An organization may be a company, a corporation, a partnership, a firm, a government agency or entity, a not-for-profit entity, a group or collection of associated members, or some other entity formed for virtually any purpose (e.g., professional, social, educational). Either or both organizations and individual members may "follow" and/or be followed by other members, may share and/or received shared information, may initiate and receive communications with other members, may post content and/or receive content posted by other members, may form connections with other members, etc.

In embodiments in which system 110 hosts a user community such as a professional network, the system may include various other components in addition to those depicted in FIG. 1.

For example, the system may include a connection server that records and maintains members' connections with other members, within a distributed or dedicated data storage system that is not depicted. Such connections may be stored as a graph, in which different nodes represent different members and a link between two given nodes represents a connection between the members, which may be explicit or implicit.

In some embodiments, an explicit connection is formed when two members establish a formal connection (e.g., one of them accepts a connection request issued by the other); an implicit (or inferred) connection is formed automatically when one member takes some action or actions that involve another member and/or content associated with that other member (e.g., sends a communication, follows or subscribes to the other member, comments on a post or other content authored by the other user).

As another example, system 110 may include one or more content servers that maintain one or more repositories (e.g., content databases) of content items for serving to members, an index of content items, and/or other information useful in serving content to members. Illustratively, the content servers may serve on the order of hundreds of millions of content items or objects every day. A content server (or some other component of system 110) may include a recommendation module for recommending specific content to serve to a member.

System 110 may include yet other components, services, and/or servers not illustrated in FIG. 1. Also, functionality attributed herein to system 110 may be distributed among its components in an alternative manner, such as by merging or further dividing functions of one or more components, or may be distributed among a different collection of components. Yet further, while depicted as separate and individual hardware components (e.g., computer servers) in FIG. 1, a component of system 110 (e.g., an extractor 112, correlator 114, confidence evaluator 116, credibility evaluator 118, profile server 120) may alternatively be implemented as separate software modules executing on one or more computer servers. Thus, although only a single instance of a particular component of system 110 may be illustrated in FIG. 1, it should be understood that multiple instances of some or all components may be utilized.

Figure 2:
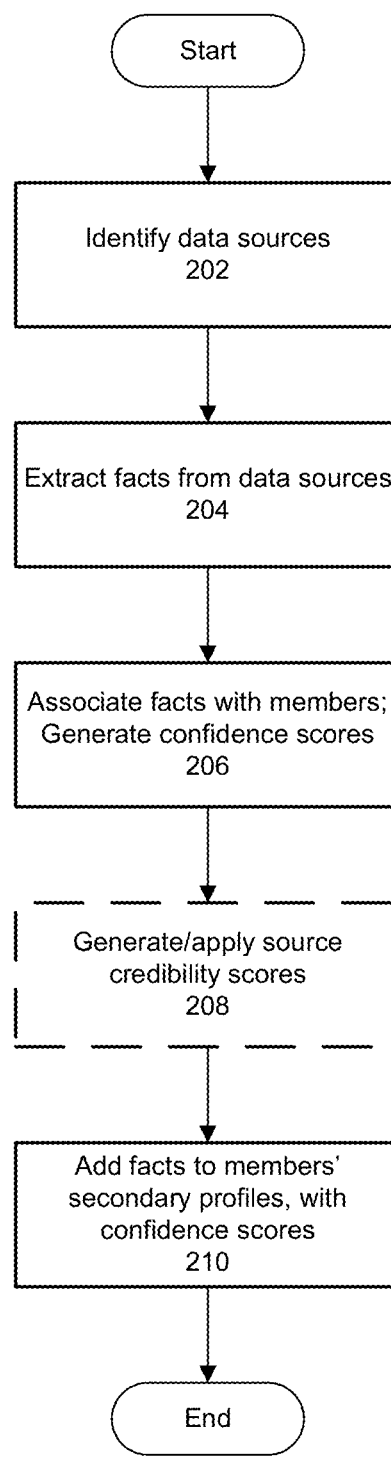
FIG. 2 is a flow chart illustrating a method of assembling a secondary (or inferred) profile, with confidence scores, in accordance with some embodiments.

FIG. 2 is a flow chart illustrating a method of assembling a secondary (or inferred) profile, according to some embodiments. These embodiments are implemented by a system that hosts a user community enjoyed by a large number of members or users, such as a professional networking service. For each member (or user), the system maintains a primary profile that is exclusively (or almost exclusively) populated by the member, and that includes personal, professional, demographic, social, and/or other types of information. The site also maintains secondary profiles for some or all members of the community. The secondary profiles include attributes/fields/components that match some or all of the primary profiles' attributes/fields/components, and/or others, but are assembled primarily from data sources other than the members. The data sources may include sources within the user community and/or sources external to the community.

In other embodiments, one or more of the illustrated operations may be omitted, repeated, and/or performed in a different order. Accordingly, the specific arrangement of steps shown in FIG. 2 should not be construed as limiting the scope of the embodiments.

In operation 202, multiple data sources are identified for extraction of facts. A given data source may be public in nature, meaning that virtually anyone can retrieve information from the source free of charge, or may be private, meaning that a subscription or other fee must be paid in order to obtain information from the source.

The data sources may include publishers, publication repositories, blogs, electronic libraries, professional and/or social networking services, other types of applications and/or services (e.g., systems/sites that host other user communities), and so on, and may yield information of various types or categories (e.g., financial, social, medical, sports, professional, hobbies). Some data sources may be excluded because of the type of information they provide (e.g., pornography), because they are private, and/or for other reasons.

New data sources may be added periodically (e.g., by system operators). For example, when multiple members link, post, share documents, or otherwise identify content from a particular data source from which facts are not already extracted, it may be verified as a valid source and added.

In operation 204, facts are extracted from the data sources. The nature of each extracted fact depends on the data source, meaning that a repository of patents will yield facts relating to patents and patent publications (e.g., inventor name(s), invention name, date of issue, patent number, filing date), a university will provide facts relating to education (e.g., names of graduates, degrees, dates of attendance), other user communities will provide facts that may directly mirror members' primary and/or secondary profiles, a repository of publications will yield facts regarding the publications (e.g., author, publication date, title, abstract), which may be of particular types or themes (e.g., medicine, finance, technology), and so on.

In the illustrated embodiments, extractors are customized to extract documents, stories, records, and/or individual facts from the data sources. Thus, an extractor for a patent repository is configured to extract patents and/or one or more facts from patents and/or patent publications, an extractor for a medical publication source is configured to extract articles and/or facts from individual medical publications, and so on. When an object comprising one or more facts is extracted (e.g., a patent from a patent repository, a publication from a publication repository, a blog entry from a blog, a list from a user directory), the identities of that object and its source are retained. This allows the sources of virtually all inferred entries in a secondary profile to be easily identified, and may facilitate calculation of credibility scores. In some implementations, every fact added to a secondary profile is accompanied by metadata that identifies the source of the fact.

In illustrative implementations, one or more extractor jobs are configured to extract facts from each of multiple specific data sources. Multiple jobs may run against one source to obtain different set of facts or overlapping sets of facts, and may use different extraction algorithms or logic. Similarly, multiple jobs targeting the same facts may be run against different sources of those facts. Thus, for each attribute or component of a secondary profile, any number of extractors may execute to extract facts from any number of sources of data related to that attribute.

For example, extraction jobs to identify skills held by members of a user community may target data sources such as member profiles within the user community, profiles of other members within the community (e.g., other users having relationships with or connections to the members), user profiles of other user communities, and data repositories of online services external to the user community. Some data sources may provide no data related to a particular member, while other data sources may provide facts that agree with or that contradict facts extracted from other data sources.

A given extractor may be configured based on the schema or format of the data to be extracted. Thus, an extractor of patent data will be configured or programmed to identify facts regarding patents (e.g., patent number, patent title, inventor(s), issue date), and to access each of multiple patent documents in a repository to obtain the desired facts. Similarly, an extractor of publication data will be configured to access a publication repository, select publications, and extract their relevant facts (e.g., author(s), title, publication date, publisher). From each data source, one or more records, articles, or other documents may be extracted (which may themselves be deemed data sources), or just the facts of each document may be extracted.

In operation 206, for each extracted fact, an attempt is made to identify one or more associated or corresponding members, based on accompanying information. For example, a patent publication will usually identify one or more inventors, a professional publication will generally name one or more authors, a news story often identifies a reporter, a human subject of the story and/or people involved in the story, etc. Each pairing of a fact to a member may be termed a "fact pairing" and may be represented as <fact, member>.

In general, a machine-learning model or other algorithm (e.g., a set of rules, a decision tree) will attempt to match each fact to one or more members, based on information that accompanies the fact. Different models may be applied for different data sources and/or types of facts, and may include artificial neural networks, support vector machines, naïve Bayes classifiers, Bayesian networks, hierarchical models, and/or other some other types of machine models or rule-based algorithms.

Illustratively, for each member of the user community a corresponding member feature vector is assembled (and updated as necessary), which includes signals from the member's primary profile (and/or an existing secondary profile) such as (but not limited to): name, profile summary, position title(s), affiliations/connections, education, skills, location, publications, and so on.

For each extracted fact, a fact feature vector is assembled from information within the fact and/or information that accompanies the fact (e.g., information from the document, page, publication, or other source of the fact), which may include (but is not limited to): name(s) (e.g., authors, inventors), electronic mail address(es), affiliations/connections, title (e.g., of publication, article, invention), abstract, keywords, location/address (e.g., city and state), telephone number, and/or others.

Then, for each fact, a suitable machine-learning model measures the fit between the fact feature vector and some or all member feature vectors, and produces fact pairing. The degree of match between the fact feature vector and a given member's feature vector may form the basis of the confidence score associated with that fact pairing.

In particular, the models may be configured to generate confidence values between 0 and 1 (or within some other interval) for each fact pairing, to indicate the confidence that the fact pertains to the indicated member. The higher the similarity or the better the match, the higher the confidence score will be. As a result, each fact pairing <fact, member> will have a corresponding confidence score.

Even if a fact appears to match several members of the user community (e.g., based on full or partial name), other attributes/indicia regarding individual members and/or their connections may help disambiguate them (and may be included in the members' feature vectors). For example, if the name of one of multiple authors of a published paper is common to multiple members, connections (e.g., friends, associates) of the members having that name can help determine which set(s) of connections (if any) include one or more other authors of the paper.

In some embodiments, however, unless a particular member that may be associated with a fact can be disassociated with virtually complete certainty, and possibly even if the member can be disassociated with certainty, the fact will be included in (or considered for inclusion in) their secondary profiles, as described below.

In some implementations, a confidence score generated by a machine model in operation 206 for a fact pairing may be termed an initial confidence score. In these implementations, initial confidence scores of some fact pairings may be adjusted based on the credibility scores of the sources of the corresponding facts, to produce final confidence scores. For example, one source may indicate that a given member has one job title, while another indicates that the member has a different title, but each source may have very different levels of reliability or accuracy.

Therefore, in optional operation 208, one or more data source credibility scores are generated (if not already available or if they need to be updated), and are used to adjust or calibrate the confidence scores of fact pairings comprising facts extracted or obtained from the sources. In different implementations, credibility scores may be generated and/or applied in different ways. One method is now discussed in conjunction with FIG. 3.

Figure 3:
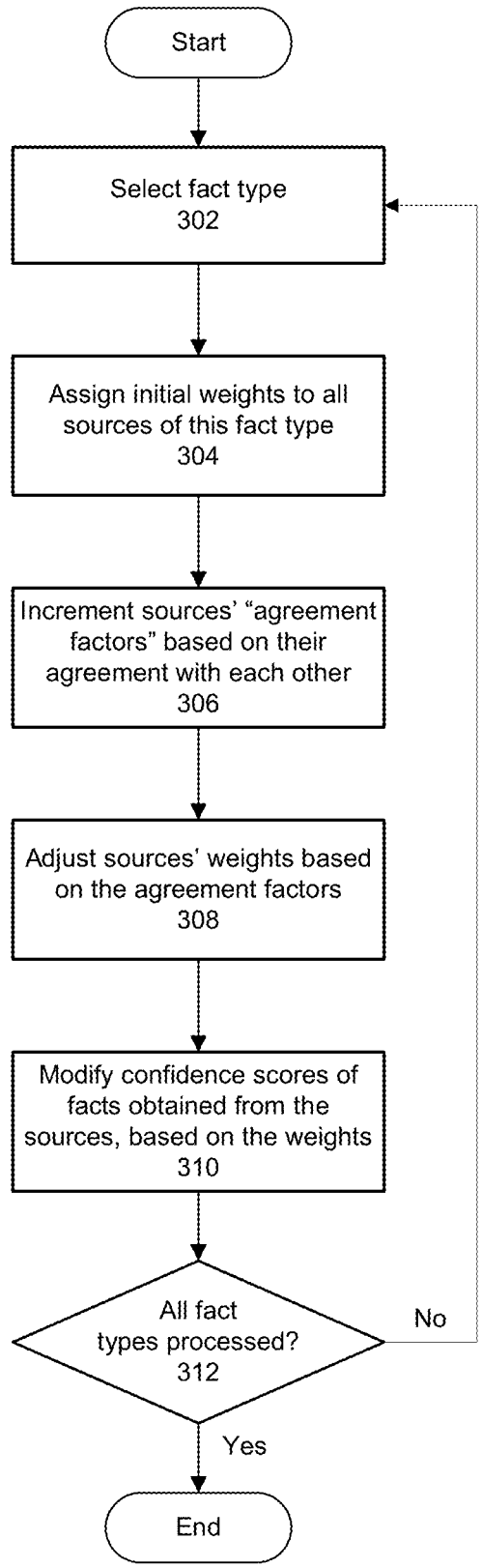
FIG. 3 is a flow chart illustrating a method of generating credibility scores, in accordance with some embodiments.

FIG. 3 is a flow chart illustrating a method of generating and applying credibility scores, according to some embodiments. In other embodiments, one or more of the illustrated operations may be omitted, repeated, and/or performed in a different order. Accordingly, the specific arrangement of steps shown in FIG. 3 should not be construed as limiting the scope of the embodiments.

In the illustrated embodiments, the method is applied separately for each type of fact that has been accumulated, wherein each fact type corresponds to a particular attribute (or field or component) of a secondary profile.

In operation 302, a first fact type is selected (e.g., publications, certifications, position, skills, patents). The individual facts obtained from the various sources may be normalized in some manner (e.g., through natural language processing) so that duplication of a given fact among multiple data sources can be easily detected. Normalization may, for example, enforce the use of uniform abbreviations and/or acronyms (or replace them with their full terms), eliminate or add articles (e.g., "a," "the"), apply uniform formatting, etc.

In operation 304, all data sources from which at least a threshold number of facts were extracted (e.g., one) are assigned initial weights, such as 1.0. Initial weights of all the sources may be equal, although this is not required in all embodiments. Each data source may be envisioned as a separate node in an undirected graph; in some implementations generation of credibility scores may employ such a graph.

In operation 306, all facts of the selected type are reviewed, and 'agreement factors' of individual data sources, which may initialized to 1 (or some other integer), are incremented for each fact on which they agree. Thus, for a fact such as authorship of a particular publication or possession of a particular certification by a person having a particular name, the agreement factor of each data source that produced that fact is incremented (e.g., by 1). Uncorroborated facts yielded by a source do not improve the source's agreement factor which, as discussed below, will be used to adjust the sources' weights.

In an implementation in which data sources are represented as nodes in a graph, connections may be established between two nodes the first time their data sources agree on a fact of the selected type; thereafter, the strength of the connection may be increased each time they agree on another fact. The sum of the strengths of all the connections of one node with other nodes will match the corresponding data source's agreement factor.

In some implementations, when a set of two or more data sources agree on a fact, strengths of the connections among all of their corresponding nodes (i.e., in a fully connected manner) are incremented by one, regardless of the number of data sources that agree. In some other implementations, the connection strengths are incremented proportional to the number of data sources in agreement—the greater the number of sources that agree on the fact, the greater the increase in their connection strengths.

After all facts of the selected type have been processed and data sources' agreement factors have been finalized, in operation 308 the sources' weights are adjusted according to the agreement factors. In different implementations, this may involve different calculations, but the general outcome is that the weights of the data sources are adjusted proportionally to the degree to which they agree with other data sources.

For example, in some implementations, the following equation is applied for each data source (or node):

$$W(s_i) = (1-d) + d\sum_{j=1}^{m} \frac{W(s_j)}{A(s_j)} \quad (1)$$

wherein $W(s_i)$ is the weight of data source i (e.g., represented in a graph as node i), d is a damping factor between 0.0 and 1.0 (e.g., 0.85), $s_j$ (i.e., data source j) is represented by a node/adjacent to node i, and $A(s_j)$ is the agreement factor of data source j. In this equation, there are m nodes adjacent to the node corresponding to data source i. Two nodes are considered adjacent (and their corresponding data sources are 'in agreement') if they have agreed on at least one fact, in which case they will be directly connected in a graph of nodes representing the data sources. As a result of equation (1), a node that is not adjacent to any other node retains the same weight it had previously, while all other nodes receive adjusted weights based on their neighbors' agreement factors.

To ensure that the effects of data sources' agreements with each other propagate throughout all sources of the selected fact type, equation (1) may be iterated across all nodes a target number of times (e.g., 100) and/or until a weight (e.g., a selected node's weight, an average weight, a median weight, the minimum or maximum weight) changes less than a target amount (e.g. 0.05). Thus, operation 308 may involve multiple executions of equation (1).

In some other embodiments, a weight (W) of a data source or node i, with which n other data sources agree regarding at least one fact, is recursively calculated using the following equation:

$$W(i) = (1-d) + d\sum_{j=1}^{n} \left(SC(i,j) * \frac{W(j)}{C(j)}\right) \quad (2)$$

In equation (2), SC(i, j) is the connection strength or agreement factor between data sources (or nodes) i and j. In some illustrative implementations, SC(i, j) is calculated by summing the confidence scores of all facts available from data source i and dividing that sum by the sum of the confidence scores of all facts that can be (or are) obtained from data source j. C(j) is the sum of connection strengths or agreement factors between data source j and all other data sources. Thus, if data source j agrees with data source k on one fact and agrees with data source l on 3 facts, and does not agree on any facts with any other data sources, then C(j)=4.

As with equation (1), equation (2) is computed iteratively until no source's weight changes from one iteration to another by more than a threshold (e.g., 0.001, 0.01).

In operation 310, the data sources' final weights are adopted as their credibility scores and are used to modify the confidence scores of fact pairings involving facts received from those sources. For example, in some embodiments, a final confidence score (FC) of a pairing including fact f obtained from data source i is calculated as $$FC(f) = IC(f)^{\frac{1}{\ln(e+W(i))}}$$

wherein IC(f) is the initial confidence score of fact f, which may be determined as discussed above in conjunction with the method illustrated in FIG. 2, and W(i) is the final weight (i.e., the credibility score) of source i as calculated above.

In operation 312, the method of FIG. 3 returns to operation 302 if one or more fact types have not been processed. Otherwise, the method ends. It may be noted that sources that receive very low credibility scores (e.g., on average, on each of a threshold number of applications of the method) may be dropped as data sources.

In some implementations of the method of FIG. 3, a data source's credibility score applies to (e.g., is used to modify) confidence scores for some or all facts obtained from the data source. For example, a given data source (e.g., a database of user profiles of an online service) may provide multiple types of facts—such as facts that identify (or that may identify) members' skills and job positions. A credibility score for this data source may affect confidence scores for all of the facts it yields.

In some other implementations, a data source may be defined or treated with more granularity, such that it receives different credibility scores for different types of facts, for instance. For example, for each iteration of the method of FIG. 3 for a different type of fact, data (e.g., weights, agreement factors) may be reinitialized and a data source that provides multiple types of facts may receive a different credibility score. It will be recalled that a data source may be a relatively large repository (e.g., a database, a document archive) or one compilation of information (e.g., an article, a publication, a document) extracted from a larger repository.

Returning now to the method of FIG. 2, in operation 210, fact pairings whose confidence scores (as adjusted by the sources credibility scores, if applied) are below a threshold (e.g., 30%, 50%) may be discarded while, for some or all other fact pairings, the indicated fact is added to the corresponding member's secondary profile, with the associated confidence score. One universal cut-off or threshold score may apply to all fact pairings, or different thresholds may apply to different facts, based on their data sources, the attribute/field/component of the secondary profile in which the fact is (or would be) placed (i.e., the fact types), and/or other criteria.

After operation 210, the method ends, or may return to operation 202 to repeat the process. In some embodiments, the entire method may be repeated on a regular basis (e.g., every day, every N days (N>1)), or may be repeated for different data sources according to different fixed or dynamic schedules. Thus, a data source that updates its data or releases new data on a regular schedule may be re-processed accordingly. As one alternative, a data source may be re-processed when its contents change, which may occur regularly or irregularly.

Figure 4:
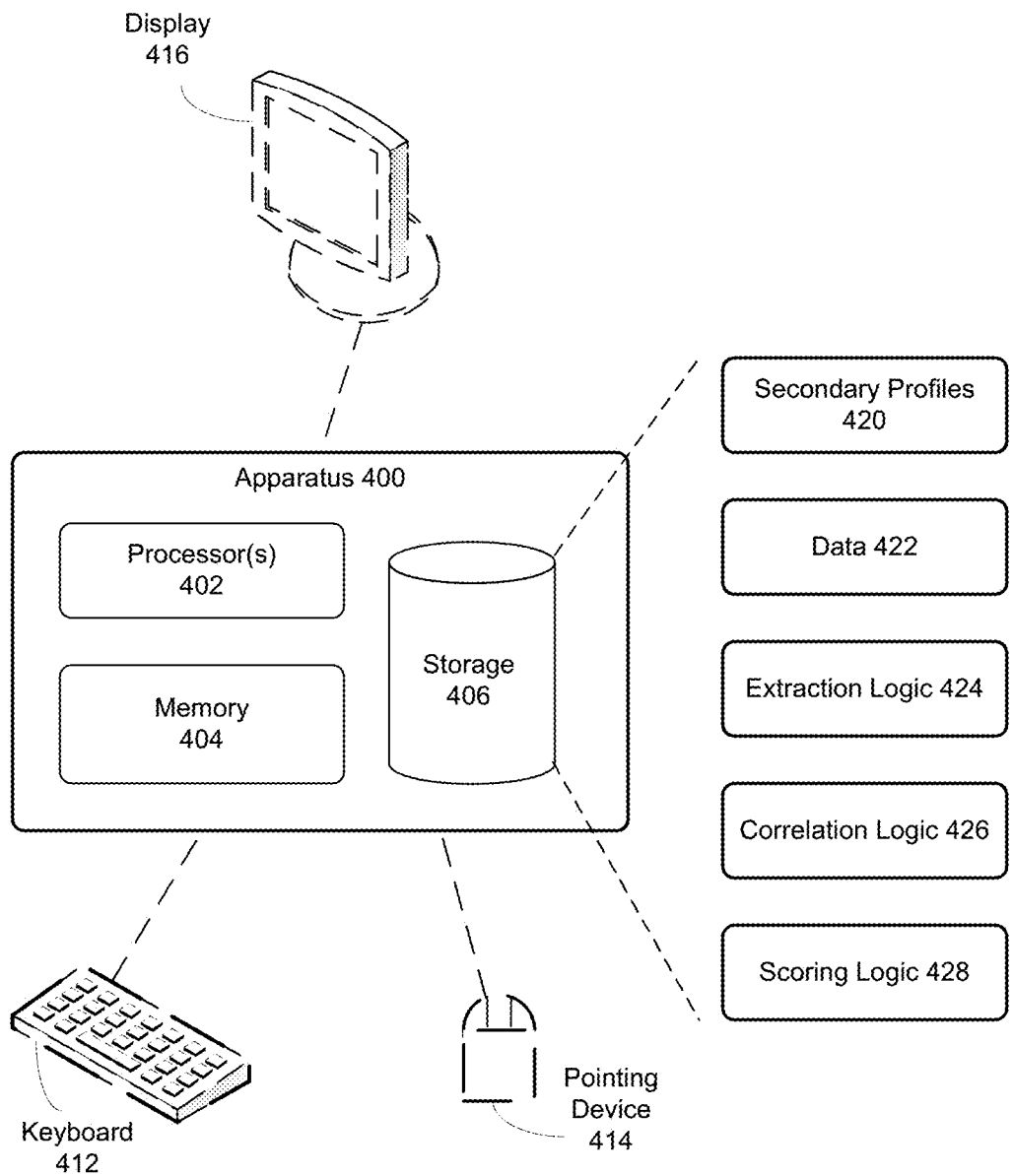
FIG. 4 is a block diagram of an apparatus for generating and/or maintaining secondary profiles, in accordance with some embodiments.

FIG. 4 is a block diagram of an apparatus for generating and/or maintaining secondary profiles, according to some embodiments. In these embodiments, the secondary profiles correspond to members of a user community of an online service, such as a professional network.

Apparatus 400 of FIG. 4 includes processor(s) 402, memory 404, and storage 406, which may comprise one or more optical, solid-state, and/or magnetic storage components. Storage 406 may be local to or remote from the apparatus. Apparatus 400 can be coupled (permanently or temporarily) to keyboard 412, pointing device 414, and display 416.

Storage 406 stores secondary profiles 420 and data used by the apparatus to support the generation and/or use of secondary profiles 420. For example, data 422 may include facts extracted or obtained from data sources, fact pairings, confidence scores, credibility scores, identities of the sources of each fact, and/or other information. Storage 406 may also retain other related information, such as primary profiles, member connections within the user community, and so on, or such information may be reside external to storage 406 and/or apparatus 400.

In addition to secondary profiles 420 and data 422, storage 406 also contains logic that may be loaded into memory 404 for execution by processor(s) 402. Such logic includes extraction logic 424, correlation logic 426, and scoring logic 428. In other embodiments, any of these logic modules may be divided to separate its functionality as desired, or multiple logic modules may be combined.

Extraction logic 424 comprises processor-executable instructions for extracting or obtaining facts from data sources. The data sources may include repositories of virtually any information from which a component of a secondary profile can be populated. Logic 424 may also be configured to normalize facts to enable comparison and matching of facts from different sources.

Correlation logic 426 comprises processor-executable instructions for attempting to correlate a fact with one or more members of the user community. Facts that can be associated with one or more members may be added to their secondary profiles, depending on their confidence scores, while facts that cannot be associated with any members may be discarded. Logic 426 may be configured to apply any suitable machine learning model.

Scoring logic 428 comprises processor-executable instructions for assigning confidence scores to fact pairings, and/or credibility scores to data sources. In some implementations, correlation logic 426 may determine confidence scores as part of its correlation efforts. As described in more detail above, a confidence score reflects a confidence in a corresponding fact pairing. A credibility score provides a measure of reliability of a corresponding data source, and may affect the confidence scores of one or more facts obtained from that source. Scoring logic 428 may also use credibility scores to modify confidence scores (or merge/aggregate the scores) as needed.

In some embodiments, apparatus 400 performs some or all of the functions ascribed to one or more components of system 110 of FIG. 1.

As indicated above, in different embodiments, different rules, criteria, and methods may be used to match facts to members/users of an application or service, using any suitable machine-learning models or other algorithms. In general, personal names (e.g., names extracted from publications) are used to match the facts to members/users having those names, although other information may be used (e.g., telephone number, user identifier, electronic mail address).

Thus, an electronic mail address found in a publication may be used to match the publication, and any facts extracted from the publication, with one or more members who have been associated with that address. Similarly, proper nouns (e.g., names of schools, organizations, groups) extracted from a publication may be matched with members whose profiles include those nouns (e.g., for education, employer, group membership). As a result, a patent publication that identifies an inventor and an entity (e.g., an organization) to which the patent has been assigned may be matched with some confidence to a member who name matches the name of the inventor and whose employer matches the name of the assignee.

In addition to matching a publication and/or fact to a member based on personal attributes or details of the member, such matching may be confirmed when the publication identifies other individuals (or details of other individuals) that can be matched to the member's connections. More specifically, by identifying other people (e.g., other authors of a publication, other inventors named in a patent, colleagues mentioned in an article), whether by name or some other detail(s) such as electronic mail address, the publication and its facts can be associated with a member whose connections include some or all of those other individuals. The greater the number of those individuals that are included among the member's connections, the more likely the member is correctly being matched with the publication. In the same vein, if the publication mentions some particular attribute(s) (e.g., a school, an employer, a qualification or certification), even if a given member does not have those attributes in his or her profile, if his/her connections include a significant number (or proportion) of people who have those attributes, the member may be matched with one or more facts gleaned from the publication.

Yet further, a publication may be matched to a member that may be the author (or one of multiple authors) by comparing the writing style of the publication with members' writing styles (for those members for whom writing samples have been identified). Also, a photo within or associated with a publication may be matched to images of members, using facial recognition software and/or other image-matching algorithms.

As one example of the extraction of facts and assignment of (initial) confidence scores for those facts, consider an extraction job configured to obtain facts that are not included in the members' primary profiles, but which can be deduced from primary profiles of the members' connections (e.g., at least the 1st degree connections). By way of illustration, for a given member, attributes such as skills, education (e.g., school, degree), employer, industry, functional area, and/or others, may be deduced from the same attributes of users with whom the member has a relationship.

Therefore, if most of the member's connections have B.S. degrees in computer science, and work as software engineers, these facts can be associated with the member with some measurable confidence score, which will depend upon the number/percentage of the connections that have those facts and/or the machine-learning model used to generate the score.

Similarly, if the member does not list an alma mater in his primary profile, and if a large percentage of the member's connections have identified a certain college or university as their alma mater, that institution may be added to the corresponding attribute of the member's secondary profile with a suitable confidence score, especially if he appears to have recently graduated from college (e.g., based on his or her age, based on his or her lack of a work history), in which case it would be natural for many of his relationships to have been formed at school. The stronger the relationship between the member and a given other user (e.g., as measured by frequency of interaction, by number of common connections, by number of other similar attributes), the more likely it may be that the member's attributes are complementary to the other user's.

Yet further, to deduce skills of the member that are not listed in his primary profile, his connections may be grouped by factors such as skills they have identified, their industries, their employers, their locations, and/or other factors. A suitable machine-learning model may then be used to determine, based on similarities between the connections and the member, in terms of skills, industry, employer, location, etc. (to the extent these attributes of the member's primary profile were populated by the member), whether the member is likely to have particular skills. Thus, the more in common the member has with particular connections (in terms of industry, employer, location, etc.), the more likely he is to have the same skills those connections have.

For each fact deduced by this job, a corresponding confidence score (e.g., between 0 and 1) is assigned to reflect the confidence that the fact is correctly associated with the member. Thus, if several of the member's $1^{st}$ degree connections have identified "Java® programming" as a skill, that skill may be placed in the member's secondary profile with some confidence score, such as 0.3.

Generation of a confidence score for this (or some other) skill added to the member's secondary profile may consider whether the member populated his primary profile with any skills or whether he left that attribute blank. In particular, if the member populated his primary profile with some skills, especially ones related to the one being added (e.g., "C++ programming," "software development"), the confidence score may be lower than it would be if he had left the attribute blank, to account for the member's deliberate omission of the new skill, which he may feel he does not possess.

A job such as this one that examines members' connections and their primary profiles may be executed on a regular basis (e.g., daily), in order to consider any profile updates made by the member's connections and/or new connections added by the member.

A second illustrative job may examine what the member entered into his primary profile, and/or other contributions of the member within the user community (e.g., posts, messages to other members/users). If the member's personal summary or other writings indicate that he has written one or more programs in Java, this job may add the "Java programming" skill to his secondary profile with a second confidence score, such as 0.5.

These first two example jobs can relatively easily associate facts with specific members, because of the nature of the data source (i.e., internal to the user community that is generating the secondary profile). In contrast, a third example job may extract facts from an external data repository or external user community (e.g., another social network, a community of software programmers, a repository of professional publications), in this case perhaps the GitHub® community of software developers (hosted at www.github.com).

At this site, each user profile may be processed to try to match the user to a member of the immediate user community. In some implementations, one feature vector is generated from each GitHub user profile, and one feature vector is assembled for each member of the user community. The vectors are then run through a suitable model to produce values indicating how similar each GitHub user profile is to each member profile. A suitable cut-off value or threshold is selected, so that for each GitHub profile, the top N matches (e.g., approximately 200) among all members of the user community are separated from the rest.

Then, or in parallel, standardized or normalized versions of the GitHub profiles are assembled, using natural language processing and/or other techniques, which allow the GitHub profiles to be more accurately compared to the best (i.e., up to N) candidates for matching the GitHub user to a member of the user community.

Using these standardized profiles (or vectors or other representations of the profiles), each candidate member's profile is closely compared with the GitHub profile to find the best match. Subsequently, facts that can be extracted or deduced from the GitHub profile (e.g., "Java programming" because the GitHub user profile identifies a lot of Java code) are added to the 'winning' member's secondary profile with suitable confidence scores, which may depend upon how closely that member's profile in the user community matched the standardized GitHub profile.

A final example job for obtaining facts may involve determining one or more possible certifications held by members but not listed in their primary profiles. This job may analyze members' personal summaries, acronyms/initials they've placed after their names (e.g., PMP, CPA, CISSP), and/or other information produced by the members, and determine whether they likely hold one or more particular certifications (e.g., Project Management Professional, Certified Public Accountant, Certified Information Systems Security Professional).

This determination may be aided by an analysis that indicates how often members who hold those certifications (as indicated by listing them in their primary profiles) identify them in other places (e.g., in their personal summaries, by adding the acronyms after their names). The more likely it is for members to identify them in some other way (e.g., a percentage of members that hold the certification), the higher the confidence can be that a member that did not list a certification in her primary profile, but did identify in some other way, does actually have the certification. In some implementations, if the confidence score associated with a fact deduced in this manner exceeds some predetermined threshold, it will be added to her secondary profile. In other implementations it will be added with an appropriate confidence score, regardless of how low that confidence is.

The results of the various extraction jobs that collect facts for correlation or matching with members may comprise a set of (partial) intermediate secondary profiles, each one populated with facts obtained by a different job. Thus, each job may produce any number of facts that, once associated with a particular member of the user community, can be assembled as a full or partial intermediate secondary profile, depending on how many facts were produced.

The intermediate secondary profiles for a given member are then combined or aggregated to produce the member's secondary profile. This process will use the confidence scores of each fact, and possibly credibility scores of the facts' sources.

Multiple facts associated with one attribute of a secondary profile may all be assigned (e.g., multiple different skills, multiple past job titles). For an attribute that can have only one value (e.g., current job title, employer), multiple facts that agree (i.e., have the same value) may bolster the final confidence score associated with that value and that attribute, while multiple facts that disagree may be processed to select a final value with a suitable confidence score. In this situation, data sources' credibility scores may have a significant impact.

By configuring privacy controls or settings as they desire, members of a social network, a professional network, or other user community that may use or interact with embodiments described herein can control or restrict the information that is collected from them or about them, the information that is provided to them, their interactions with such information and with other members, and/or how such information is used. Implementation of these embodiments is not intended to supersede or interfere with the members' privacy settings.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method, comprising:
    populating primary profiles of members of a user community with information provided by the corresponding members;
    extracting a plurality of facts from multiple data sources other than the user community; and
    for each fact, with one or more computers:
        for each of one or more members, generating a confidence score representing a confidence that the fact is associated with the member by:
            assembling a fact feature vector comprising attributes of the fact and the data source from which the fact was extracted; and
            applying a machine learning model to compare the fact feature vector with a member feature vector representing the member; and
        for each member having a confidence score above a threshold, adding the fact to a secondary profile of the member;
    wherein each member's secondary profile is populated without requiring action by the corresponding member and is not viewable by other members of the user community.

2. The method of claim 1, wherein:
    a member feature vector representing a given member of the user community comprises attributes of the given member's primary profile.

3. The method of claim 2, wherein the member feature vector representing the given member further comprises attributes of primary profiles of one or more connections of the given member within the user community.

4. The method of claim 2, wherein the attributes of the given member's primary profile include two or more of:

name;
summary;
position;
education; and
skills.

5. The method of claim 2, wherein the attributes of the given member's primary profile include one or more of:
patents;
projects; and
publications.

6. The method of claim 1, wherein:
for each of the multiple data sources, a different machine learning model is applied for facts extracted from the data source.

7. The method of claim 1, further comprising for at least a first fact:
modifying the generated confidence scores based on a credibility score associated with the data source from which the first fact was extracted.

8. The method of claim 1, further comprising:
identifying a first fact extracted from two or more different data sources, wherein first confidence scores generated for a first member associated with the first fact, for each of the two or more data sources, differ; and
aggregating the first confidence scores to yield a final confidence score.

9. The method of claim 1, further comprising, for each fact added to a given secondary profile of a given member:
recording the confidence score associated with the given member and the given fact; and
recording the data source of the given fact.

10. An apparatus, comprising:
one or more hardware processors; and
memory storing instructions that, when executed by the one or more processors, cause the apparatus to:
populate primary profiles of members of a user community with information provided by the corresponding members;
extract a plurality of facts from multiple data sources other than the user community; and
for each fact:
for each of one or more members, generate a confidence score representing a confidence that the fact is associated with the member by:
assembling a fact feature vector comprising attributes of the fact and the data source from which the fact was extracted; and
applying a machine learning model to compare the fact feature vector with a member feature vector representing the member; and
for each member having a confidence score above a threshold, add the fact to a secondary profile of the member;
wherein each member's secondary profile is populated without requiring action by the corresponding member and is not viewable by other members of the user community.

11. The apparatus of claim 10, wherein a member feature vector representing a given member of the user community comprises:
attributes of the given member's primary profile; and
attributes of primary profiles of one or more connections of the given member within the user community.

12. The apparatus of claim 11, wherein the attributes of the given member's primary profile include two or more of:
name;
summary;
position;
education; and
skills.

13. The apparatus of claim 10, wherein the memory further stores instructions that, when executed by the one or more processors, cause the apparatus to, for at least a first fact:
modify the generated confidence scores based on a credibility score associated with the data source from which the first fact was extracted.

14. The apparatus of claim 10, wherein the memory further stores instructions that, when executed by the one or more processors, cause the apparatus to:
identify a first fact extracted from two or more different data sources, wherein first confidence scores generated for a first member associated with the first fact, for each of the two or more data sources, differ; and
aggregate the first confidence scores to yield a final confidence score.

15. A system, comprising:
a profile module comprising a non-transitory computer-readable medium storing instructions that, when executed, cause the system to populate primary profiles of members of a user community with information provided by the corresponding members;
an extraction module comprising a non-transitory computer-readable medium storing instructions that, when executed, cause the system to extract a plurality of facts from multiple data sources other than the user community; and
a correlation module comprising a non-transitory computer-readable medium storing instructions that, when executed, cause the system to, for each fact:
for each of one or more members, generate a confidence score representing a confidence that the fact is associated with the member by:
assembling a fact feature vector comprising attributes of the fact and the data source from which the fact was extracted; and
applying a machine learning model to compare the fact feature vector with a member feature vector representing the member; and
for each member having a confidence score above a threshold, add the fact to a secondary profile of the member;
wherein each member's secondary profile is populated without requiring action by the corresponding member and is not viewable by other members of the user community.

16. The system of claim 15, wherein:
a member feature vector representing a given member of the user community comprises:
attributes of the given member's primary profile; and
attributes of primary profiles of one or more connections of the given member within the user community.

17. The system of claim 16, wherein the attributes of the given member's primary profile include two or more of:
name;
summary;
position;
education; and
skills.

* * * * *